United States Patent
Sievers-Paulsen et al.

(10) Patent No.: US 10,781,615 B2
(45) Date of Patent: Sep. 22, 2020

(54) LOCKING DEVICE FOR A MOTORCYCLE SEAT

(71) Applicant: Bayerische Motoren Werke Aktiengesellschaft, Munich (DE)

(72) Inventors: Johann Sievers-Paulsen, Freising (DE); Peter Reinhart, Peissenberg (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 86 days.

(21) Appl. No.: 16/167,854

(22) Filed: Oct. 23, 2018

(65) Prior Publication Data

US 2019/0093396 A1    Mar. 28, 2019

Related U.S. Application Data

(63) Continuation of application No. PCT/EP2017/055796, filed on Mar. 13, 2017.

(30) Foreign Application Priority Data

May 25, 2016    (DE) .......................... 10 2016 209 092

(51) Int. Cl.
*E05B 79/20*    (2014.01)
*E05B 83/28*    (2014.01)
(Continued)

(52) U.S. Cl.
CPC ................. *E05B 79/20* (2013.01); *B62J 1/12* (2013.01); *B62K 19/46* (2013.01); *E05B 83/28* (2013.01);
(Continued)

(58) Field of Classification Search
CPC .... E05B 83/28; E05B 79/20; Y10T 292/1057; Y10S 292/14; B60R 7/04; B60R 7/06
(Continued)

(56) References Cited

U.S. PATENT DOCUMENTS 1,669,356 A  *  5/1928  Stevenson ............... E05B 83/24
                                                    292/225
2,575,211 A  *  11/1951  Flacke ................... B62D 25/12
                                                    296/76

(Continued)

FOREIGN PATENT DOCUMENTS

CN    1135988 A    11/1996
CN    1478691 A    3/2004
(Continued)

OTHER PUBLICATIONS

International Search Report (PCT/ISA/210) issued in PCT Application No. PCT/EP2017/055796 dated May 29, 2017 with English translation (six pages).
(Continued)

*Primary Examiner* — Carlos Lugo
(74) *Attorney, Agent, or Firm* — Crowell & Moring LLP

(57) ABSTRACT

A locking device for locking a seat of a vehicle, in particular a motorcycle or motorcycle-like vehicle, is provided. The locking device includes a locking element for locking the seat and a Bowden cable for actuating the locking device. The Bowden cable is connected by a first end to the locking element and by a second end to an actuation lever for actuating the Bowden cable. A vehicle with the locking device is also provided.

8 Claims, 4 Drawing Sheets

(51) Int. Cl.
  *B62J 1/12* (2006.01)
  *B62K 19/46* (2006.01)
  *F16C 1/10* (2006.01)
  *F16C 1/12* (2006.01)

(52) U.S. Cl.
  CPC ............... *F16C 1/10* (2013.01); *F16C 1/12* (2013.01); *E05Y 2900/53* (2013.01); *Y10S 292/14* (2013.01); *Y10T 292/1057* (2015.04)

(58) Field of Classification Search
  USPC .......... 296/37.12, 37.8, 24.34, 37.1; 74/500, 74/501.6, 502.2, 519, 543
  See application file for complete search history.

(56) References Cited

U.S. PATENT DOCUMENTS

| | | | | |
|---|---|---|---|---|
| 3,010,531 A * | 11/1961 | Flora | ...................... | B60R 25/007 180/287 |
| 4,099,593 A * | 7/1978 | Schultz | .................. | B60R 25/04 109/59 R |
| 4,526,057 A * | 7/1985 | Mochida | ............... | E05B 53/005 292/336.3 |
| 4,697,842 A * | 10/1987 | Kawasaki | ................. | B62J 6/00 296/78.1 |
| 4,872,366 A * | 10/1989 | Appleby | ................ | E05B 83/24 74/501.6 |
| 4,907,428 A * | 3/1990 | Nakashima | ............... | B62J 9/00 180/219 |
| 4,917,418 A * | 4/1990 | Gokee | ..................... | B60K 15/05 292/125 |
| 5,025,883 A * | 6/1991 | Morinaka | ................. | B62J 7/00 180/219 |
| 5,107,949 A * | 4/1992 | Gotoh | ..................... | F02B 61/02 180/219 |
| 5,147,077 A * | 9/1992 | Nakajima | ................. | B62J 9/00 224/413 |
| 5,531,489 A * | 7/1996 | Cetnar | .................... | E05B 85/12 292/225 |
| 5,533,783 A * | 7/1996 | Harms | ...................... | B62J 1/12 180/219 |
| 5,662,369 A * | 9/1997 | Tsuge | ..................... | B60N 2/366 292/225 |
| 5,681,068 A * | 10/1997 | Kleefeldt | ................ | E05B 13/005 292/336.3 |
| 5,853,060 A * | 12/1998 | Chao | ....................... | E05B 83/16 180/69.2 |
| 5,927,794 A * | 7/1999 | Mobius | .................. | E05B 13/00 296/146.1 |
| 5,953,963 A * | 9/1999 | Wirsing | ................... | F16C 1/12 403/106 |
| 6,050,619 A * | 4/2000 | Arabia, Jr. | ................ | F16C 1/12 292/216 |
| 6,623,071 B2 * | 9/2003 | Kawamoto | ............... | B62J 1/12 297/195.13 |
| 6,929,294 B2 * | 8/2005 | Byrla | ...................... | B60Q 1/26 292/336.3 |
| 7,448,663 B2 * | 11/2008 | Fujimoto | ............... | B62H 5/006 292/150 |
| 7,520,195 B2 * | 4/2009 | Dupont | .................. | F16C 1/105 439/322 |
| 7,556,114 B2 * | 7/2009 | Hanagan | ................ | B62K 11/00 180/219 |
| 7,708,326 B2 * | 5/2010 | Misaki | ...................... | B62J 9/00 292/259 A |
| 7,780,207 B2 * | 8/2010 | Gotou | ..................... | E05B 79/20 292/201 |
| 8,418,793 B2 * | 4/2013 | Yano | ......................... | B62J 1/12 180/219 |
| 9,599,146 B2 * | 3/2017 | Nagaoka | .................... | B62J 1/00 |
| 10,273,725 B2 * | 4/2019 | Van Wiemeersch | .... | E05B 77/26 |
| 2001/0022462 A1 | 9/2001 | Kawamoto et al. | | |
| 2008/0203795 A1 * | 8/2008 | Olson | ...................... | B60N 2/40 297/313 |
| 2012/0175927 A1 * | 7/2012 | Parker | ...................... | B60N 2/12 297/311 |
| 2015/0191946 A1 * | 7/2015 | Nishida | ...................... | B62J 9/26 292/200 |
| 2020/0040616 A1 * | 2/2020 | Hu | .......................... | E05B 77/06 |

FOREIGN PATENT DOCUMENTS

| | | | | |
|---|---|---|---|---|
| CN | 1532108 A | 9/2004 | | |
| CN | 201863925 U | 6/2011 | | |
| CN | 202518391 U | 11/2012 | | |
| CN | 104925189 A | 9/2015 | | |
| CN | 204871304 U | 12/2015 | | |
| DE | 1 183 403 B | 12/1964 | | |
| DE | 297 06 896 U1 | 5/1997 | | |
| DE | 19952798 C1 * | 5/2001 | ............. | E05B 83/36 |
| DE | 20 2013 000 239 U1 | 3/2013 | | |
| EP | 2138389 A1 * | 12/2009 | ............. | E05B 79/20 |
| EP | 2 960 143 A1 | 12/2015 | | |
| JP | 2-100888 U | 8/1990 | | |
| JP | 200411257 * | 1/2004 | | |
| JP | 2010-200961 A | 9/2010 | | |

OTHER PUBLICATIONS

German-language Written Opinion (PCT/ISA/237) issued in PCT Application No. PCT/EP2017/055796 dated May 29, 2017 (five pages).
German-language Search Report issued in counterpart German Application No. 10 2016 209 092.5 dated Jan. 12, 2017 with partial English translation (13 pages).
Chinese-language Office Action issued in counterpart Chinese Application No. 201780012621.3 dated Aug. 5, 2019 with English translation (16 pages).
Chinese-language Office Action issued in Chinese Application No. 201780012621.3 dated Mar. 2, 2020 with English translation (10 pages).

* cited by examiner

LOCKING DEVICE FOR A MOTORCYCLE SEAT

CROSS REFERENCE TO RELATED APPLICATIONS

This application is a continuation of PCT International Application No. PCT/EP2017/055796, filed Mar. 13, 2017, which claims priority under 35 U.S.C. § 119 from German Patent Application No. 10 2016 209 092.5, filed May 25, 2016, the entire disclosures of which are herein expressly incorporated by reference.

BACKGROUND AND SUMMARY OF THE INVENTION

The invention relates to a locking apparatus for locking a seat of a vehicle, in particular of a motorcycle or motorcycle-like vehicle.

Motorcycles or motorcycle-like vehicles frequently have a seat which is provided either for the driver of the vehicle or a passenger or for both together, and is connected to the vehicle such that it can be folded. The seat can usually be pivoted between an open position which makes an access to a storage compartment which is present below the seat possible, and a closed position.

In order to prevent unauthorized folding open of the seat, the seat is as a rule of lockable configuration. To this end, the vehicle comprises a dedicated lock which can be actuated by way of a key, usually the ignition key of the vehicle. An arrangement of this type is known, inter alia, from DE 297 06 896 U1.

An alternative locking means of the seat is known from the BMW K1200LT motorcycle, which locking means provides an unlocking means by means of a Bowden cable and is shown as prior art in FIG. 1. By way of actuation of a pulling knob, a locking apparatus of the seat can be unlocked via the Bowden cable.

It is an object of the invention to improve a locking apparatus of this type, in particular to reduce a pulling force which is required to actuate the Bowden cable.

Accordingly, a locking apparatus for locking a seat of a vehicle, in particular of a motorcycle or motorcycle-like vehicle, is proposed, having a locking element for locking the seat, and a Bowden cable for actuating the locking apparatus, the Bowden cable being connected by way of a first end to the locking element. Moreover, a second end of the Bowden cable is connected to an actuating lever for actuating the Bowden cable.

The seat of the vehicle is to be understood to mean, in particular, the rider's seat and/or the seat of a passenger (what is known as the pillion), or a continuous seat for both people, and as a rule provides a closure cap or a lid for a storage space which is arranged below the seat. With the aid of the locking apparatus, the seat can be closed in a closed position which as a rule is at the same time the operating position of the vehicle, by the locking element being in engagement, for example, with a suitable recess or an undercut of the seat. Via the Bowden cable, the locking element can be released from the engagement as required, with the result that the locking apparatus is unlocked and the seat can be opened. Within the context of the description, the term "Bowden cable" is also to be understood to mean a control wire or a cable pull.

In order to keep a pulling force which is required to actuate the Bowden cable low for a user and to make the operation easy, an actuating lever is provided at the second end of the Bowden cable.

For example, the second end of the Bowden cable can be connected to the actuating lever in a manner which is spaced apart from a rotational axis of the actuating lever. The connection of the second end is therefore arranged eccentrically with respect to the rotational axis, with the result that a pulling force which is required to actuate the actuating lever can be set and metered easily via an adaptation of the lever lengths which result.

Furthermore, the second end of the Bowden cable can be mounted displaceably in a slot of the actuating lever. This means that the slot is provided at or in the actuating lever and the second end engages into said slot in such a way that the second end can be moved displaceably within the slot. This affords the possibility that the actuating lever has a first movement range, in which, although merely the second end moves within the slot in the case of a movement of the actuating lever, no pulling force is yet exerted on the Bowden cable. A resulting pulling force is brought about on the Bowden cable, in order to actuate the locking element, only after the second end has reached the edge of the slot.

Said embodiment makes it possible, for example, that the actuating lever can first of all be moved toward the user without a pulling force, with the result that the user can grip the actuating lever in an improved manner. This can take place, for example, by means of a prestressed spring which moves the actuating lever from a set-back position into an easily grippable actuating position within the context of the first movement range, without a pulling force being brought about on the Bowden cable in the process.

Furthermore, the locking element can be of rotationally movable configuration about a rotational axis and can comprise a hook for locking the seat. With the aid of the hook, the locking element can be brought into engagement with a recess or an undercut of the seat. On account of the rotational movability of the locking element, a suitable lever ratio for providing the desired forces of the connecting apparatus can be selected via a suitable selection of an attachment point of the first end of the Bowden cable, which attachment point is arranged eccentrically with respect to the rotational axis.

Furthermore, a vehicle, in particular a motorcycle or motorcycle-like vehicle, is provided, having a seat which can be folded between a closed and an open position, and a locking apparatus for locking the seat in the closed position. Here, the locking apparatus is configured in accordance with the description.

A motorcycle-like vehicle is to be understood to mean, in particular, a motor scooter, for example a two-wheel, three-wheel or four-wheel motor scooter, a scooter, a trike, a quad bike or the like.

In accordance with one preferred embodiment, the actuating lever is arranged in a closable luggage compartment of the vehicle. This means that the actuating lever is accessible only in the case of an open luggage compartment. In this way, an unauthorized actuation of the actuating lever can be prevented by way of a closure of the luggage compartment. Owing to a lack of accessibility of the actuating lever, unauthorized opening of the seat is accordingly suppressed at the same time. This embodiment affords the advantage that merely the luggage container has to be closed. This is usually the case anyway, in order to secure a luggage item which is situated in the luggage container. In this way, a separate lock for locking the seat can be dispensed with, however.

For example, the luggage compartment is a side case of the vehicle. In particular, the side case is installed fixedly to the vehicle, laterally on the vehicle in the region of a rear wheel. The side case is particularly preferably mounted fixedly on the vehicle, with the result that the side case is a fixed vehicle constituent part and is not provided for regular dismantling by way of the user. In particular, the side case can comprise illumination elements of the vehicle, such as tail lights, indicators or the like.

The side case preferably comprises a case part which is fixed to the vehicle, the actuating lever being arranged in the case part which is fixed to the vehicle. The actuating lever can likewise preferably be arranged in an interior space of the case part, which interior space defines a storage volume, and/or in a connecting region to a second case part.

This means at any rate that the actuating lever is arranged in the interior in a closed state of the side case and is therefore not accessible from the outside. Here, the actuating lever can be arranged at any desired location within the storage volume of the case part which is fixed to the vehicle. A connecting region is to be understood to mean, for example, an end side of the case part which is fixed to the vehicle, which end side is loaded or at least covered by the second case part in the closed state of the side case.

Furthermore, the second case part can be configured in such a way that, in a closed state of the side case, it holds the actuating lever in the position which is set back with respect to the (easily grippable) actuating position. This can take place, for example, by virtue of the fact that, during the closure of the side case, the actuating lever is loaded by the second case part and is pressed into the set-back position by way of the closing movement. Here, the actuating lever is preferably configured with the described slot, in order to provide the first movement range which can be utilized for this purpose. In the closed state of the side case, the actuating lever therefore disappears in the set-back position in a space-saving manner, but is easily accessible for the user in the easily grippable actuating position in the open state.

In this case, in addition, the actuating lever can be moved toward the user during the opening of the side case, with the result that said user can grip the actuating lever in an improved manner. This can optionally take place by means of the prestressed spring which moves the actuating lever from the set-back position into the easily grippable actuating position within the context of the first movement range, without a pulling force being brought about on the Bowden cable in the process.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
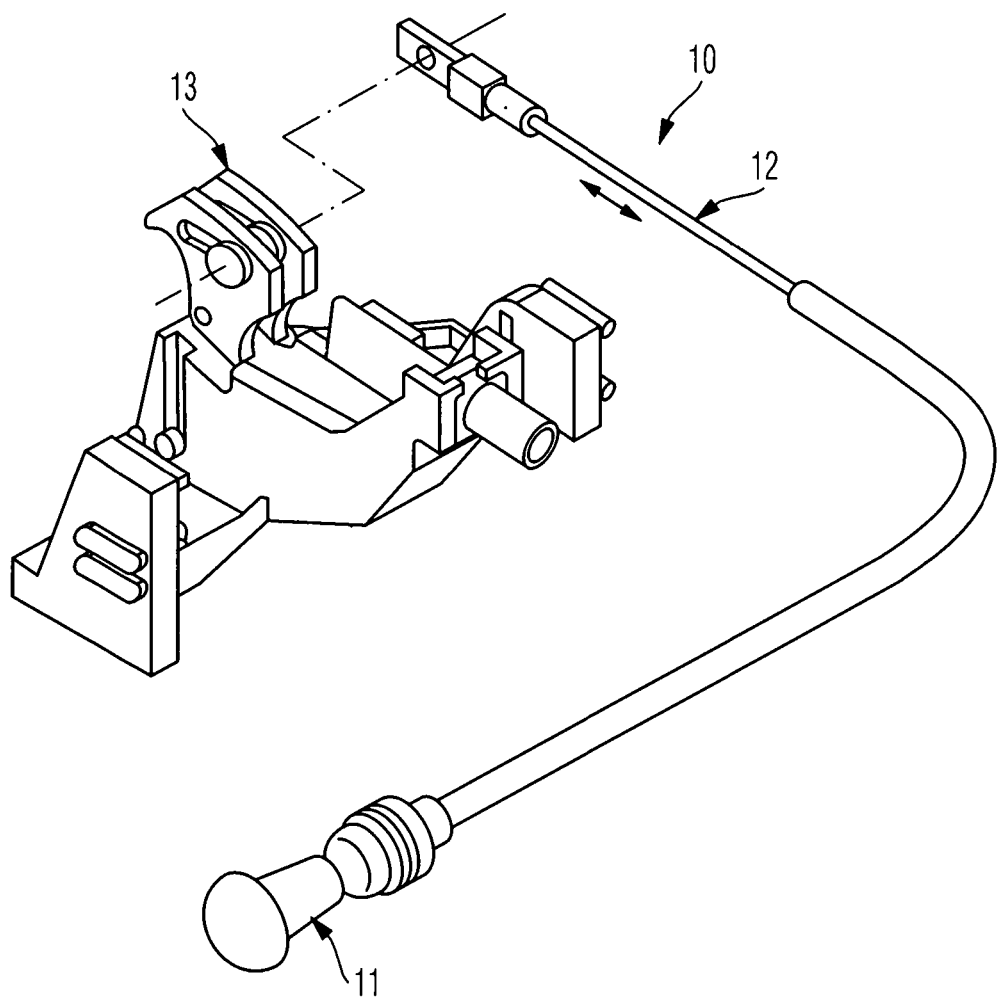
FIG. 1 shows a locking apparatus in accordance with the prior art.

FIG. 1 shows a locking apparatus 10 of a seat (not shown) in accordance with the prior art, which locking apparatus 10 is used in the BMW K1200LT motorcycle. By way of actuation of a pulling knob 11, the locking apparatus 10 can be unlocked via a Bowden cable 12, by a locking element 13 being brought out of engagement with the seat.

Figure 2:
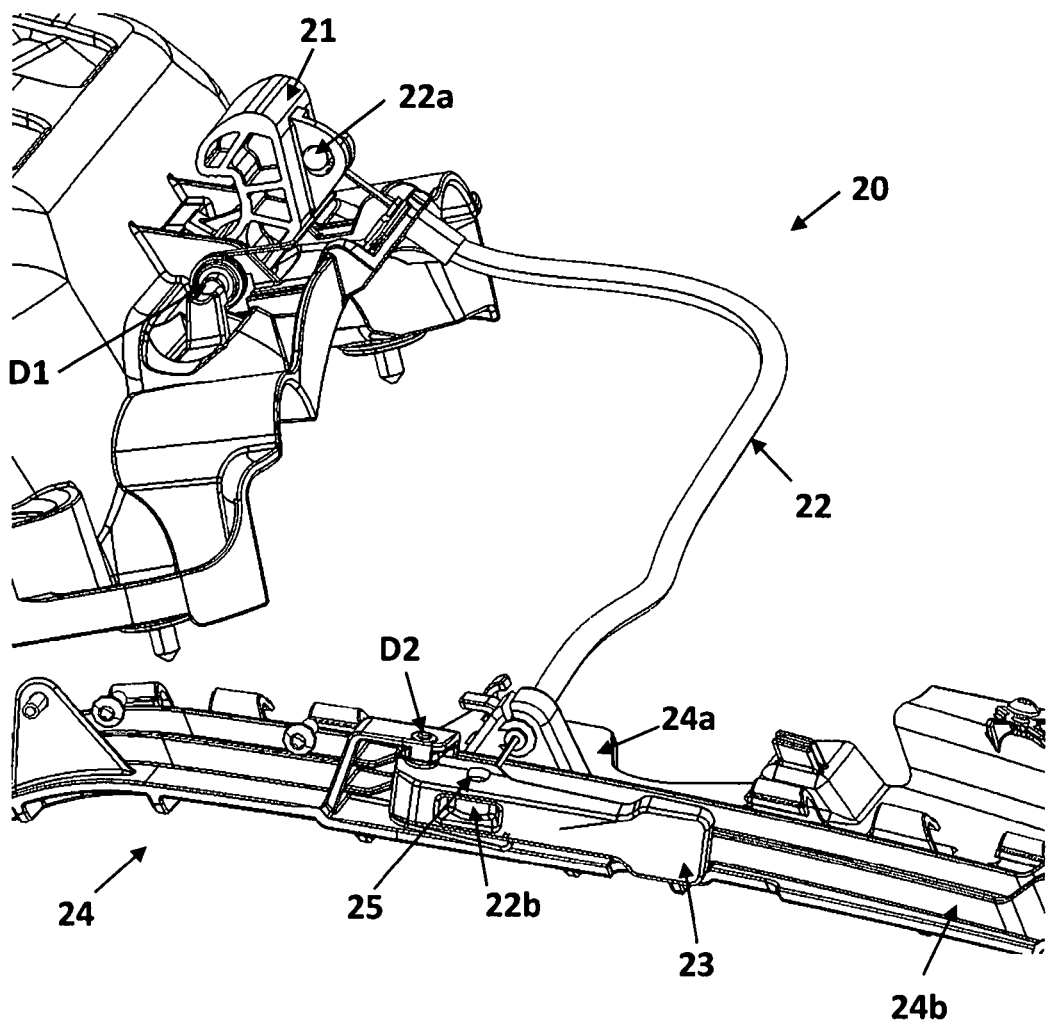
FIG. 2 shows a locking apparatus in a perspective view in accordance with an embodiment of the present invention.

FIG. 2 shows a perspective view of a locking apparatus 20 in accordance with an embodiment of the present invention. The locking apparatus 20 is configured for locking a seat (not shown) of a vehicle, in particular of a motorcycle or motorcycle-like vehicle. To this end, the locking apparatus 20 comprises a locking element 21 for locking the seat, and a Bowden cable 22 for actuating the locking apparatus 20. The locking element 21 itself is of rotationally movable configuration about a rotational axis D1 and comprises a hook for locking the seat.

Figure 3:
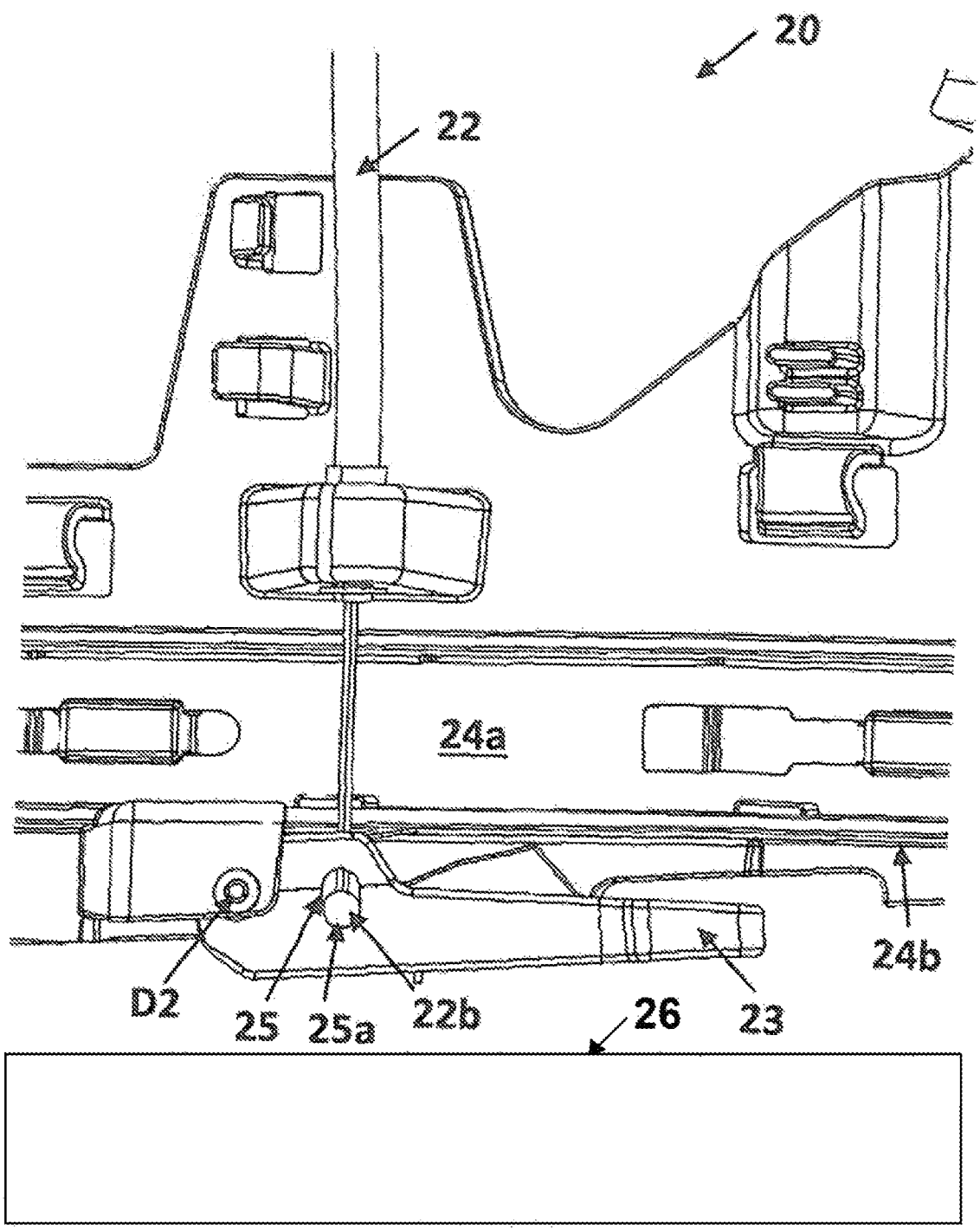
FIG. 3 shows a partial plan view of the locking apparatus in accordance with FIG. 2 in a closed position.
Figure 4:
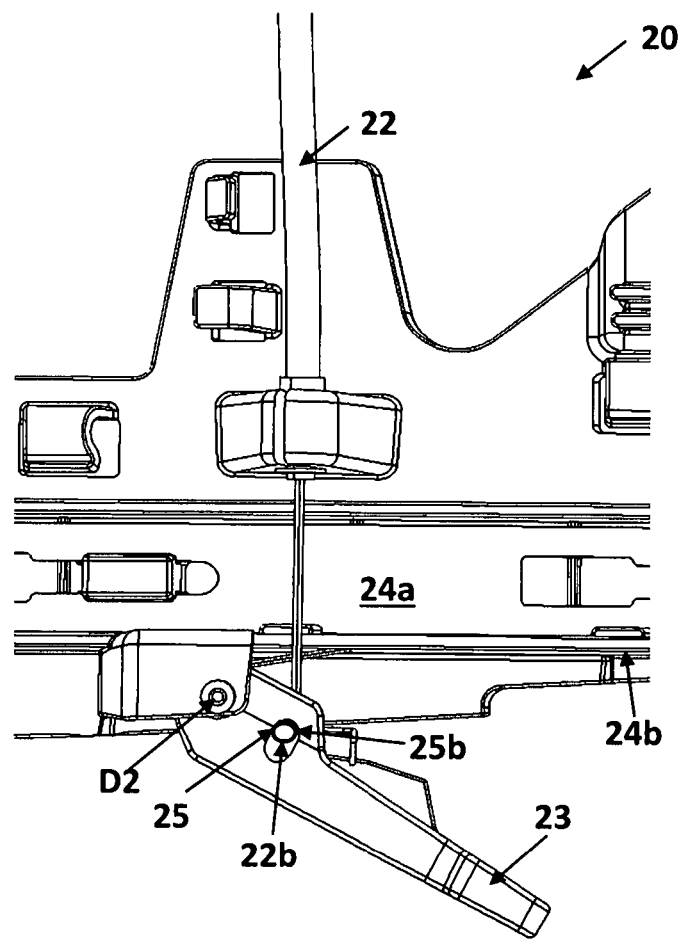
FIG. 4 shows a partial plan view of the locking apparatus in accordance with FIG. 2 in a closed position.

The Bowden cable 22 is connected by way of a first end 22a to the locking element 21. A second end 22b of the Bowden cable 22 is connected to an actuating lever 23 for actuating the Bowden cable 22. As shown in FIGS. 3 and 4, the second end 22b is connected to the actuating lever 23 in a manner which is spaced apart eccentrically from a rotational axis D2 of said actuating lever 23.

The connection is configured in such a way that the second end 22b of the Bowden cable 22 is mounted displaceably in a slot 25 of the actuating lever 23.

Furthermore, the actuating lever 23 is arranged within a lockable luggage compartment 24 (shown merely in part), the luggage compartment 24 being a side case of the vehicle. Said side case comprises a case part 24a which is fixed to the vehicle and in which the actuating lever 23 is arranged. In the embodiment which is shown, the actuating lever 23 is arranged in a connecting region 24b to a second case part 26. The connecting region 24b is defined by an end side of the case part 24a which is fixed to the vehicle, and is accordingly concealed by the second case part in a closed state of the side case, with the result that the actuating lever 23 is protected against unauthorized use.

Furthermore, the second case part can be configured in such a way that, in a closed state of the side case, it holds the actuating lever in the position in accordance with FIGS. 2 and 3 which is set back with respect to the actuating position, or presses said actuating lever into said set-back position.

FIG. 3 shows a partial plan view of the locking apparatus 20 in accordance with FIG. 2, which locking apparatus 20, furthermore, is situated in the closed position. The actuating lever 23 is arranged in the set-back position on the case part 24a which is fixed to the vehicle. Here, the second end 22b of the Bowden cable 22 is arranged eccentrically with respect to the rotational axis D2 at a remote end 25a of the slot 25.

If, as shown in FIG. 4, the actuating lever 23 is actuated in order to unlock the locking apparatus 20, the second end 22b of the Bowden cable 22 is first of all displaced in the longitudinal direction of the slot 25 until it arrives at the end 25b which is close to the Bowden cable 22. An introduction of pulling force takes place only now to the Bowden cable 22 which sets the locking element 21 in movement and releases it from the engagement with the seat, in order to release said seat for opening.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A locking apparatus locking a seat of a motorcycle or motorscooter, comprising:
a locking element configured to move between a lock position, to lock the seat in a closed position, and an unlock position, allowing the seat to move in the open position;
a Bowden cable configured to actuate the locking apparatus to unlock the seat; and
an actuating lever,
wherein
a first end of the Bowden cable is coupled to the locking element,
a second end of the Bowden cable is coupled to the actuating lever,
the actuating lever is arranged inside a closable luggage compartment which is a side case of the motorcycle or motorscooter preventing unauthorized access to the actuating lever, and
when the closeable luggage compartment is opened, the actuating lever is reachable such that actuation of the actuating lever actuates the Bowden cable to move the locking element into the unlock position and allow the seat to move into the open position.

2. The locking apparatus as claimed in claim 1, wherein the second end of the Bowden cable is coupled to the actuating lever at a location on the actuating lever spaced apart from a rotational axis of the actuating lever.

3. The locking apparatus as claimed in claim 2, wherein the second end of the Bowden cable is located displaceably in a slot of the actuating lever.

4. The locking apparatus as claimed in claim 3, wherein the locking element is rotationally movable about a rotational axis and includes a hook configured to engage the seat to lock the seat in the closed position.

5. A motorcycle or motorscooter, comprising:
a seat movable between a closed and an open position on the motorcycle or motorscooter;
a closable luggage compartment including a case part fixed to the motorcycle or motorscooter at a side of the seat; and
a locking apparatus, the locking apparatus including:
a locking element configured to move between a lock position, to lock the seat in a closed position, and an unlock position, allowing the seat to move in the open position;
a Bowden cable configured to actuate the locking apparatus to unlock the seat; and
an actuating lever,
wherein
a first end of the Bowden cable is coupled to the locking element,
a second end of the Bowden cable is coupled to the actuating lever,
the actuating lever is arranged inside the case part of the closable luggage compartment which is a side case of the motorcycle or motorscooter preventing unauthorized access to the actuating lever, and
when the closeable luggage compartment is opened, the actuating lever is reachable such that actuation of the actuating lever actuates the Bowden cable to move the locking element into the unlock position and allow the seat to move into the open position.

6. The vehicle as claimed in claim 5, wherein
the side case includes a case part configured to be fixed to the motorcycle or motorscooter, and
the actuating lever is arranged in the case part.

7. The vehicle as claimed in claim 6, wherein
the actuating lever is arranged in one or both of an interior space of the case part and in a connecting region to a second case part.

8. The vehicle as claimed in claim 7, wherein
the second case part is configured such that, in a closed state of the side case, the second case part holds the actuating lever in a position which is set back with respect to an actuating position of the actuating lever.

* * * * *